(12) United States Patent
Hook

(10) Patent No.: US 8,002,879 B2
(45) Date of Patent: Aug. 23, 2011

(54) USES OF AUXETIC FIBRES

(75) Inventor: Patrick Hook, Witheridge (GB)

(73) Assignee: Auxetix Limited, Devon (GB)

( * ) Notice: Subject to any disclaimer, the term of this patent is extended or adjusted under 35 U.S.C. 154(b) by 756 days.

(21) Appl. No.: 11/574,178

(22) PCT Filed: Aug. 22, 2005

(86) PCT No.: PCT/GB2005/003262
§ 371 (c)(1),
(2), (4) Date: Feb. 23, 2007

(87) PCT Pub. No.: WO2006/021763
PCT Pub. Date: Mar. 2, 2006

(65) Prior Publication Data
US 2007/0210011 A1    Sep. 13, 2007

(30) Foreign Application Priority Data
Aug. 23, 2004  (GB) .................................. 0418759.7

(51) Int. Cl.
| | |
|---|---|
| *B01D 46/00* | (2006.01) |
| *B01D 37/00* | (2006.01) |
| *B29C 67/20* | (2006.01) |
| *D03D 15/00* | (2006.01) |
| *D04H 1/00* | (2006.01) |
| *D04H 11/00* | (2006.01) |
| *B32B 25/10* | (2006.01) |

(52) U.S. Cl. ................. 95/279; 95/273; 95/278; 95/280; 210/767; 210/483; 210/497.01; 210/503; 210/505; 428/36.1; 428/296.7; 428/297.1; 442/181; 442/327

(58) Field of Classification Search .................. 210/767, 210/483, 497.01, 503, 505; 428/36.1, 296.7, 428/297.1; 442/181, 327; 95/273, 278, 279, 95/280
See application file for complete search history.

(56) References Cited

U.S. PATENT DOCUMENTS
| | | | |
|---|---|---|---|
| 3,831,369 A * | 8/1974 | Northup et al. ................. | 57/225 |
| 4,510,743 A * | 4/1985 | de Kroon ......................... | 57/260 |
| 6,878,320 B1 * | 4/2005 | Alderson et al. ............... | 264/125 |
| 6,945,026 B1 * | 9/2005 | Hanna ................................. | 57/3 |
| 7,247,265 B2 * | 7/2007 | Alderson et al. ............... | 264/125 |
| 2005/0159066 A1 * | 7/2005 | Alderson et al. ............... | 442/327 |

FOREIGN PATENT DOCUMENTS
| | | |
|---|---|---|
| WO | WO 99/22838 | 5/1999 |
| WO | WO 00/53830 | 9/2000 |
| WO | WO 03/057769 | 7/2003 |
| WO | WO 2004/088015 | 10/2004 |

OTHER PUBLICATIONS

P.J. Stott et al., "A Growth Industry Materials World," The Institute of Materials, London, GB, vol. 8, Oct. 2000, pp. 12-14.

* cited by examiner

*Primary Examiner* — John Kim
(74) *Attorney, Agent, or Firm* — King & Schickli, PLLC

(57) ABSTRACT

There is disclosed a method of controlling pore size in a porous material comprising the steps of: providing a porous material comprising a plurality of interconnected auxetic fibres; and applying a tensile or compressive load to the porous material so as to vary the pore size of the porous material in order to produce a desired effect.

8 Claims, 4 Drawing Sheets

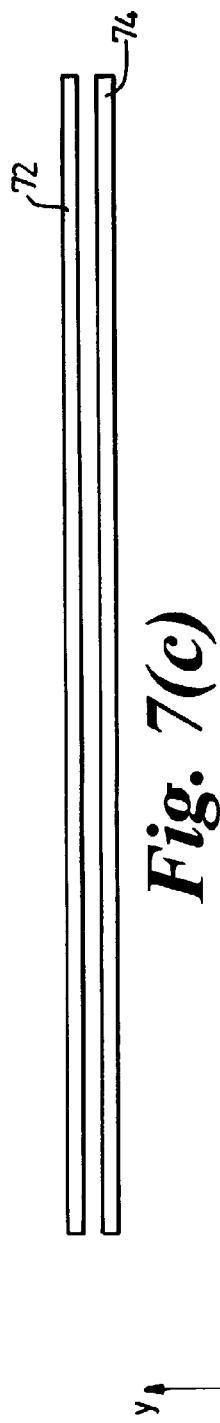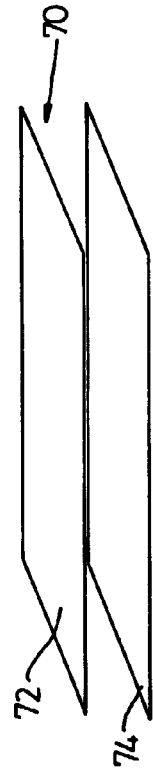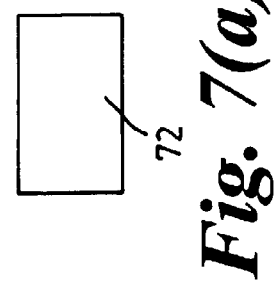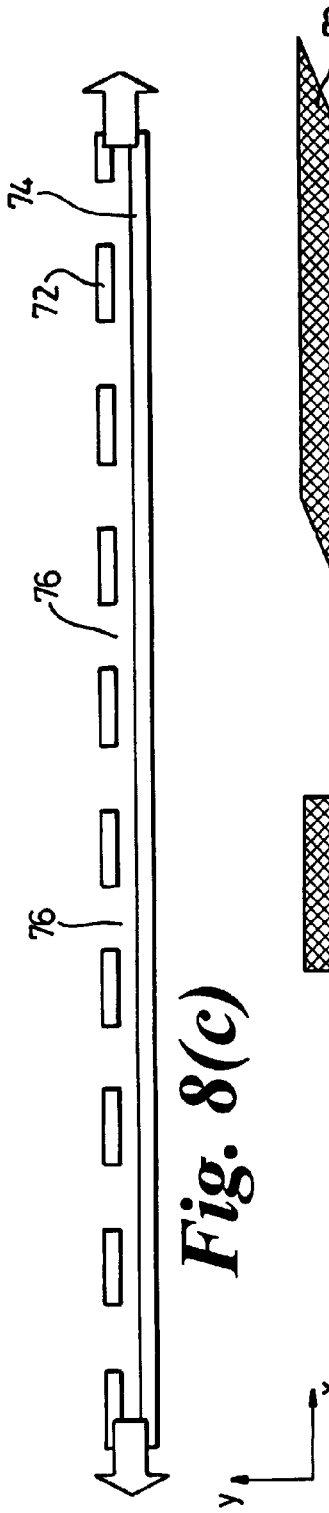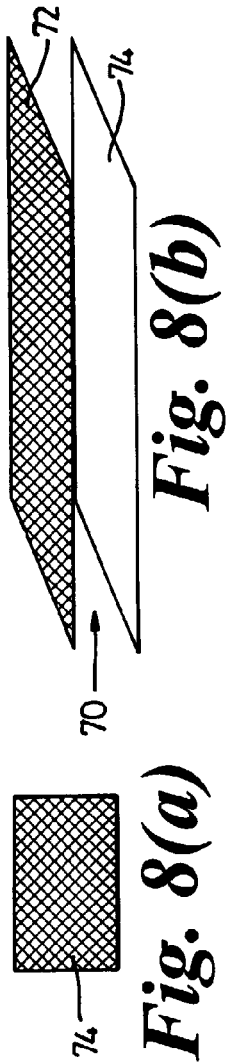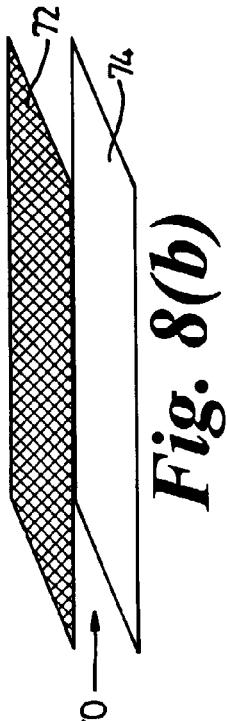

USES OF AUXETIC FIBRES

FIELD OF THE INVENTION

This invention relates to uses of auxetic fibres, in particular to sundry methods of using a porous material comprising a plurality of interconnected auxetic fibres, and to structures comprising such porous materials.

BACKGROUND OF THE INVENTION

Auxetic materials are materials that have a negative or effectively negative Poisson's ratio. In contrast to most conventional materials, auxetic materials possess the property that under a tensile load the material expands perpendicularly to the axis along which the tensile load is applied. In other words, auxetic materials expand as they are stretched. Conversely, materials are also auxetic if a compressive load applied along an axis results in a reduction in the dimension of the material along an axis perpendicular to the axis along which the compressive load is applied. Most materials exhibit a positive Poisson's ratio, this ratio being defined by the ratio of the contractile transverse strain relative to the tensile longitudinal strain. Prior art auxetic materials can essentially be divided into two categories. One category comprises honeycomb like polymeric materials, and the other category comprises materials formed by particles linked by fibrils, such as materials described in the International Publication WO 00/53830. However, both of these categories of auxetic materials have significant drawbacks preventing commercialisation on an industrial scale. In particular, there are problems in producing such auxetic materials reliably and cost-effectively using techniques which are suitable for commercialisation. Additionally, the structural characteristics of these prior art auxetic materials made them unsuitable for numerous applications. The inventor of the present application has developed a new category of auxetic materials which are described in a co-pending application. The present application relates to new and useful methods of using such auxetic materials.

SUMMARY OF THE INVENTION

According to a first aspect of the invention there is provided a method of controlling pore size in a porous material comprising the steps of:
 providing a porous material comprising a plurality of interconnected auxetic fibres; and
 applying a tensile or compressive load to the porous material so as to vary the pore size of the porous material in order to produce a desired effect.

There are a number of preferred effects which can be realised through the control of the pore size provided by the invention, the pores being defined, at least in part, by the auxetic fibres. In one embodiment the porous material is used as a filter, and the tensile or compressive load is applied to the porous material so as to vary the pore size of the porous material in order to control the filtration process. The tensile or compressive load may be applied to the porous material in order to achieve a predetermined pore size. In this way, a desired pore size can be maintained, or pore size increased in order to compensate for blockage occurring during use. In future embodiments, a tensile load is applied to the porous material in order to increase the pore size as part of a cleaning step so as to dislodge matter trapped in the pores. In this way, filter replacement costs, cleaning costs and energy consumption costs are reduced. Cleaning fluid may be passed through the pores whilst the tensile load is applied in order to assist in the cleaning. However, it is preferred that no cleaning fluid is used, and that the filter is cleaned simply by the application of a tensile load. A plurality of layers of porous material may be used as a filter. In this way it may be possible to produce complex pore shapes. Porous material fabricated from auxetic fibres having different physical characteristics such as pore size, fibre winding angle, fibre diameter or fibre type, may be used for this purpose. Industrial filtration, such as in the pharmaceutical industry, and automotive filters are examples of application areas.

In another general embodiment, a tensile load is applied to the porous material to clean the porous material by increasing the pore size of the porous material so as to dislodge matter trapped in the pores. As noted above, the porous material may be a filter, although other articles comprising the porous material may be cleaned in this manner.

In another embodiment, the desired effect is the display of a substrate, wherein;
 a structure is provided comprising the porous material disposed over the substrate; and
 a tensile load is applied to the porous material so as to increase the pore size of the porous material thereby displaying the substrate.

The substrate and the porous material may be differently coloured, so that the step of applying the tensile load causes a colour which is different to the colour of the porous material to be displayed. Alternatively, or additionally, the substrate may comprise indicia such as an image, a logo, writing or other signage, which is displayed when the tensile load is applied.

The invention provides a method for indicating strain in which the substrate is displayed when a predetermined tensile load is applied to the porous material.

The structure may be a fabric, such as a textile fabric. Advantageously, the structure comprises part of an article of clothing. This is particularly preferred when the substrate and the porous material are differently coloured. In this way, a novelty or fashion item of clothing can be produced which changes appearance in accordance with the tensile and compressive loads put upon the article of clothing, for example through everyday use. In embodiments in which the substrate is displayed in order to indicate strain, the structure may be a suitable article such as a rope or a belt.

The desired effect may be the release of a substance stored in the porous material. The substance may be an antimicrobial agent such as an antibacterial, antifungal, antiviral, antiyeast or antiamoebic agent, a drug, a deodorant, a perfume or a flavour. More than one substance may be released. Applications include dental floss, in which instance the substance may be sodium fluoride, stannous fluoride, antineoplastic agents, chlorohexidine, triclosan, flavours and other known dental floss additives. The floss may be in the form of a thread comprising a plurality of auxetic fibres, a tape or any other acceptable form. Other applications include medical uses, such as medical sutures and dressings, for release of a medically useful substance such as a drug or antimicrobial agent. In further embodiments the substance is released from an article of clothing comprising the porous material, in which instance the substance may be a perfume, a deodorant or an antimicrobial agent, especially an antifungal agent. The substance may be stored in any suitable manner, such as in the pores or coated onto the fibres.

Advantageously, the porous material comprises sheet material.

It is preferred that the porous material comprises a fabric, which is typically, but not necessarily, a sheet material. It is advantageous that sheet material and fabrics can be readily produced using auxetic fibres of the type disclosed herein. Sheet materials and/or fabrics are useful in a range of application areas, such as textiles, which prior art auxetic materials of the type described above have little or no practical utility. Fabrics of the present may be woven, knitted, non-woven, felted, braided, netted or produced by any other suitable technique.

The porous material may comprise three or more interconnected auxetic fibres. It is preferred that the auxetic fibres demonstrate auxetic properties over a substantial portion of the range of fibre lengths over which it is possible to stretch or compress the fibre without failure of the fibre.

In preferred embodiments, the auxetic fibres comprise a first component and a second component.

The modulus of elasticity of the first component may be greater than the modulus of elasticity of the second component.

Preferably, the first component and the second component extend generally longitudinally relative to an axis, and variation in a tensile or compressive load applied to the first component causes the radial position of the second component relative to the axis to vary.

Advantageously, at least one of the first component and the second component is helically wrapped around the other component. It will become apparent to the skilled reader that, with a given auxetic fibre of this type, at some applied strains both the first and second components may be helically wrapped around the other component, but at other (higher) applied strains the first component may substantially straighten so as to no longer be helically wrapped around the second component. In principle, the second component might be substantially straight at low applied strain. The pores may be formed between adjacent auxetic fibres, wherein helices formed by the first components of the adjacent auxetic fibres are in-phase but of opposite handidness and helices formed by the second components of the adjacent auxetic fibres are in-phase but of opposite handidness. It will be appreciated by the skilled reader that, since it is possible that at some applied strains the first or second component might be substantially straight, it is not a necessary condition that helices are formed by both the first components, and the second components.

The auxetic fibres may comprise a first component and a second component, the first component and the second component extending generally longitudinally relative to an axis, the first component being wrapped around the second component through one or more turns, the one or more turns being spaced longitudinally relative to the axis, variation in the tensile load on the first component causing the radial position of the second component relative to the axis to vary.

The auxetic fibres may comprise a first component and a second component, the first component and second component extending generally longitudinally relative to an axis, the first component being wrapped around the second component through one or more turns, the first component having a higher modulus of elasticity than the second component, variation in the tensile or compressive load on the first component causing the radial position of the second component relative to the axis to vary.

The auxetic fibres may comprise a first component and a second component, the first component and second component extending generally longitudinally relative to an axis, the first component being wrapped around the second component in a helical manner, variation in the tensile or compressive load on the first component causing variation in the diameter of the helix the first component follows, the variation in the diameter of the helix of the first component causing the second component to take on the form of a helix and/or causing the diameter of the helix of the second component to vary, the diameter of the second component helix increasing as the first component helix decreased in diameter, the diameter of the second component helix decreasing as the first component helix increases in diameter.

The auxetic fibres and/or the porous material may have a negative Poisson's ratio. Fibres and/or materials having a Poisson's ratio of between 0 and −35 are preferred. The Poisson ratio of a fibre is in part dependent on the pitch of the first component. A steep pitch gives rise to a relatively low auxetic effect over a relatively large strain range whereas a shallow pitch gives rise to a relatively large auxetic effect over a relatively narrow strain range. In general, more negative Poisson's ratios are preferred.

The first component may be a fibre, rod or hollow tube particularly of a relatively high modulus material. The first component may be formed of carbon fibre, glass fibre, polyaramids (e.g. Kevlar™), polyamides (e.g. nylon), polyesters, polyalkalenes, polyethyleneterepthalate (PET), metal wire, cotton or other material. The materials from which the first component is formed may be natural or man made, inorganic or organic. The first component may be sealed with a cured film, for example a cured siloxane film. In the event that the first component is a hollow tube, the tube may contain additional materials.

The second component may be a fibre, rod or hollow tube, particularly consisting of an intermediate or a low modulus material. The material is preferably capable of deformation without fracture. The second component may be formed of siloxane, liquid silicone rubber, natural rubber, nitrile rubber or other elastomeric material whether natural or man-made. However, the second component does not need to be elastomeric. For example, a polyamide such as nylon can be used advantageously, particularly in combination with a polyaramid as the first component.

The first component may have a diameter that is between 0.01 and 1 times the diameter of the second component. The first component may have a cross-sectional area that is between 0.001 and 1 times the cross-sectional area of the second component.

The first component and/or second component may be formed of a continuous material. Preferably the first component and/or second component are elongate. The first component and/or second component may be at least a hundred times as long as their maximum cross-sectional dimension or extent.

The wrapping of the first component around the second component may be provided in the form of a covering or winding. The wrapping of the first component around the second component may be in the form of a spiral or helix. The spiral or helix may have a constant pitch along the second component. The pitch may be between zero degrees and ninety degrees relative to the axis.

The second component may be linear with the first component wrapped around it. The second component may also be wrapped around the first component. The second component may be in the form of a spiral or helix. The pitch of the first component spiral or helix may be the same as the pitch of the second component spiral or helix.

The porous material may comprise repeat units of two or more auxetic fibres. The auxetic fibres in the repeat units may be arranged around a core component. However, it is preferred that a core component is not employed.

According to a second aspect of the invention there is provided a method of filtration comprising the steps of:

providing a porous material comprising a plurality of interconnected auxetic fibres; and using the porous material as a filter;
in which a tensile or compressive load is applied to the porous material so as to vary the pore size of the porous material in order to control the filtration process.

The tensile or compressive load may be applied in order to achieve a predetermined pore size.

A tensile load may be applied in order to increase the pore size as part of a cleaning step so as to dislodge matter trapped in the pores.

According to a third aspect of the invention there is provided a method of cleaning a porous material comprising a plurality of interconnected auxetic fibres; the method comprising the step of applying a tensile load to the porous material so as to increase the pore size of the porous material thereby dislodging matter trapped in the pores. The porous material may be a filter.

According to a fourth aspect of the invention there is provided a method of displaying a substrate comprising the steps of:
    providing a structure comprising i) the substrate and ii) a porous material disposed over the substrate, the porous structure comprising a plurality of interconnected auxetic fibres; and
    applying a tensile load to the porous material so as to increase the pore size of the porous material thereby displaying the substrate.

The substrate and the porous material may be differently coloured, so that the step of applying the tensile load causes a colour which is different to the colour of the porous material to be displayed. The structure may comprise part of an article of clothing.

According to a fifth aspect of the invention there is provided a method of indicating the application of a predetermined strain to a structure comprising:
    providing a structure comprising i) a substrate and ii) a porous material disposed over the substrate, the porous structure comprising a plurality of interconnected auxetic fibres; and
    applying a tensile load to the porous material so as to increase the pore size of the porous material thereby displaying the substrate when a predetermined tensile load is applied to the porous material.

According to a sixth aspect of the invention there is provided a method of dispersing high air pressures comprising the steps of:
    providing a porous material comprising a plurality of interconnected auxetic fibres; and
    exposing the porous material to a pulse of air of high pressure.

The pulse of air may be associated with blast energy from an explosion, or may be high pressure wind.

The porous material may comprise a plurality of layers, each layer comprising a plurality of interconnected auxetic fibres. At least two layers may have different physical characteristics thereby improving the dispersion of the high air pressure. The physical characteristic may be pore size, fibre winding angle, fibre diameter or fibre type.

The second to sixth aspects of the invention may include any feature set forth in respect of the first aspect of the invention, in particular regarding the nature of the auxetic fibres, porous materials, substrates and structures provided by the invention.

The invention also includes any novel structure as described herein. For example, according to a seventh aspect of the invention there is provided a porous structure comprising a plurality of layers of porous material, in which at least two of the layers of porous material comprise a plurality of interconnected auxetic fibres.

Methods and structures in accordance with the invention will now be described with reference to the accompanying drawings, in which;—

BRIEF DESCRIPTION OF THE DRAWINGS

FIG. 7 shows (a) a plan view, (b) an exploded perspective view and (c) a cross-sectional view of a fabric structure of the invention under relaxation conditions;
FIG. 8 shows (a) a plan view (b) an exploded perspective view and (c) a cross-sectional view of a fabric structure of the invention when stretched.

DETAILED DESCRIPTION OF THE INVENTION

Figure 1:
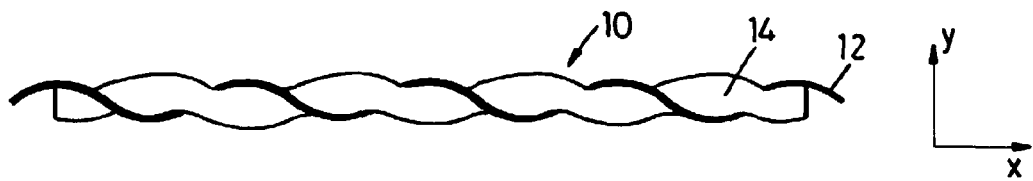
FIG. 1 shows an auxetic fibre.

FIG. 1 shows an auxetic fibre which may be utilised in the production of porous materials according to the invention. The auxetic fibre 10 comprises a first component 12 and a second component 14. The first component 12 is wrapped around the periphery of the second component 14 forming a helix. Typically, as shown in FIG. 1, the wrapping of the first component 12 around the second component 14 causes a deformation of the second component 14 from a generally linear configuration to a helical configuration. The first component is desirably formed from a material having a high modulus of elasticity, such as carbon fibre, Kevlar®, glass fibre, wire, polyamides, polyesters, polyalkalenes, BET, or a natural fibre such as cotton. The second component is preferably formed from a material of lower modulus of elasticity than the first component. Examples of suitable materials include siloxane, silicone rubber, natural rubber, nitrile rubber or polyamides such as nylon. It should be noted that it is possible for the second component to be formed from a material of relatively high modulus of elasticity, such as nylon, provided it is used in combination with a first component formed from a material of higher modulus of elasticity. For example, nylon can be used in combination with a suitable first component such as a polyaramid.

Figure 2:
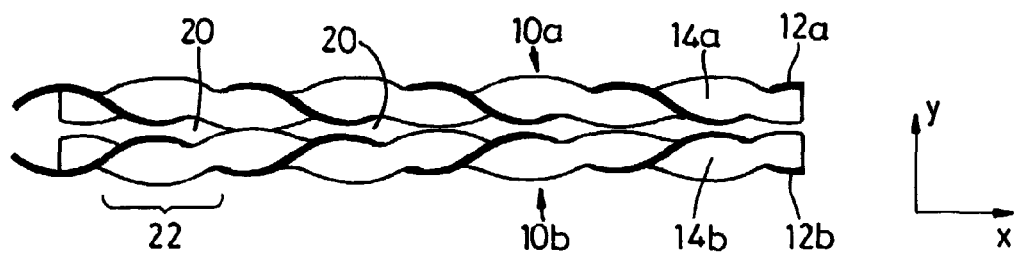
FIG. 2 shows a pair of adjacent auxetic fibres defining pores in a relaxed configuration.
Figure 3:
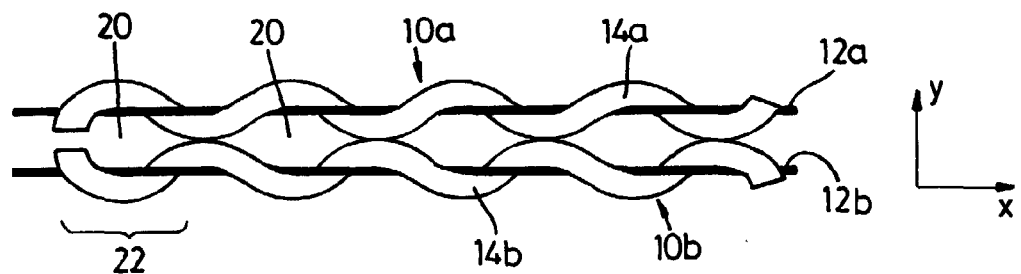
FIG. 3 shows the pair of auxetic fibres depicted in FIG. 2 under relatively high tensile load.

FIG. 2 shows a pair of auxetic fibres 10 of the type described above with reference to FIG. 1. It should be noted that the pair of auxetic fibres 10a, 10b are dispersed so as to form a plurality of pores 20. In particular, it should be noted that the helices formed by the first components 12a, 12b of the auxetic fibres 10a, 10b are in phase, but form helices of opposite handidness. Owing to the helical configuration imposed upon the second components 14a, 14b by the first components 12a, 12b, a similar relationship exists between the second components 14a, 14b, i.e. the helices formed by the second components 14a, 14b are in phase but are of opposite handidness. As a result of this configuration, pores are formed in regions such as that marked 22, where the helices formed by the second components 14a, 14b are oppositely opposed to the maximum extent. In this configuration, the helices formed by the first components 12a, 12b are at their closest. The configuration shown in FIG. 2 depicts the pair of adjacent auxetic fibres at relatively low applied tensile load. FIG. 3 depicts the same pair of auxetic fibres 10a, 10b at relatively high applied tensile load. It can be seen that the effects of applying a relatively high tensile load along the x axis, i.e., along the length of the auxetic fibres, is to cause the first components 12a, 12b to straighten. As a result of the straightening of the first components 12a, 12b, the diameter of the helices formed by the second components 14a, 14b increases. In particular, in the regions 22 in which the pores 20 are defined, one second component 14a is displaced to higher values of y whereas the other second component 14b is displaced to lower values of y. The effect of the displacements caused by the application of a tensile load is to increase the size of the pores 20. The present invention utilizes this phenomenon to advantageously control pore size in a variety of porous materials fabricated from auxetic fibres. Auxetic fibres of the type described give reference to FIG. 1 are preferred. However, it is possible to utilise other auxetic fibres. For example, an auxetic fibre can be produced which consists of a plurality of auxetic fibres of the type shown in FIG. 1 arranged around a core component. Thus, for example, an auxetic fibre might be produced utilising a pair auxetic fibres of the type shown in FIG. 2 with a core component disposed between the auxetic fibres. The core component would extend generally longitudinally along the x axis. In this instance, the overall structure could be regarded as an auxetic fibre for use in producing a porous material. The present invention anticipates that further auxetic fibres will be developed, and that such auxetic fibres can be usefully incorporated into the present invention in a straightforward manner using the principles described herein.

Figure 4:
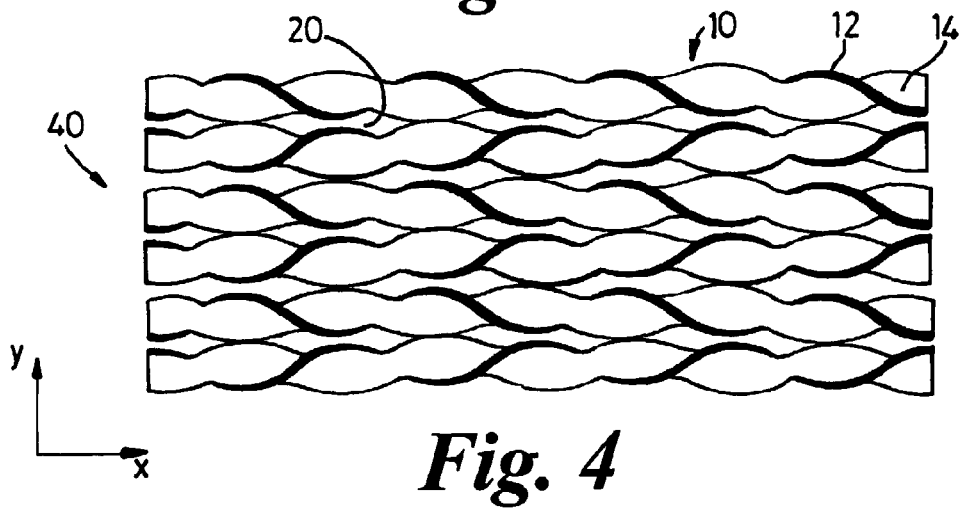
FIG. 4 shows an array of auxetic fibres with a relatively low strain applied thereto.
Figure 5:
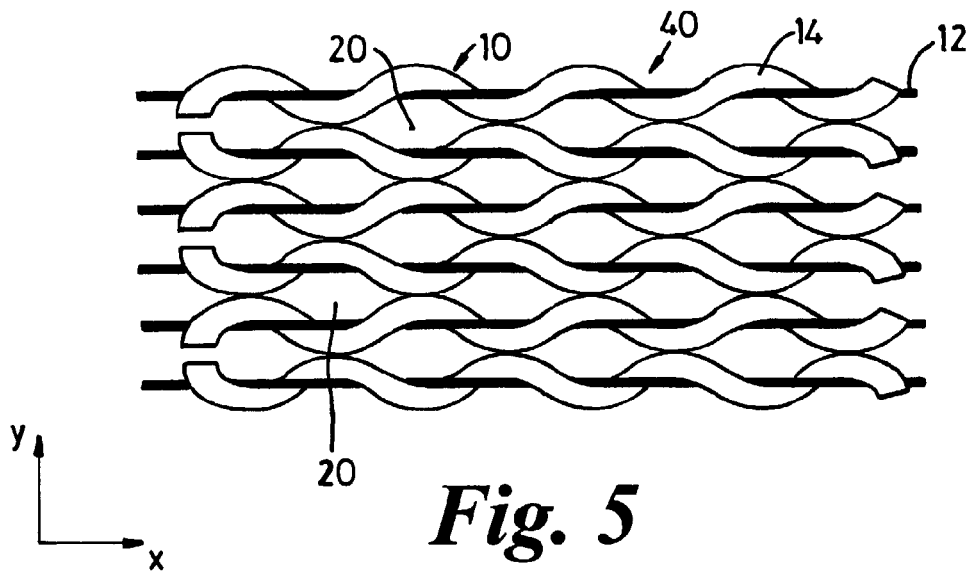
FIG. 5 shows an array of auxetic fibres with a relatively high strain applied thereto.

FIGS. 4 and 5 depict a porous material 40. The porous material 40 comprises an array of pairs of adjacent auxetic fibres of the type shown in FIGS. 2 and 3. The array of pairs of auxetic yarns forms a flat sheet fabric. The fabric shown in FIGS. 4 and 5 is a woven fabric, and for reasons of presentational simplicity, these Figures depict only the warp fibres. In other words, the weft threads are not shown in FIGS. 4 and 5, although the skilled reader will appreciate that weft threads will be present in the woven fabric so as to interconnect warp fibres. The weft fibres may be auxetic or non-auxetic in nature. FIG. 4 depicts the porous material 40 with a low tensile load applied along the x axis. It can be seen that the pores 20 are essentially closed under such conditions. FIG. 5 depicts the porous material 40 when a relatively large tensile load is applied along the x axis. It is seen that the application of the tensile load causes the pores 20 to open. By controlling the degree of strain in the material, it is possible to control the size of the pores 20.

Figure 6A:
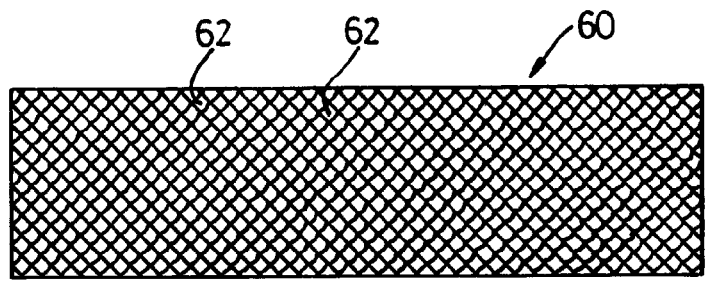
FIG. 6 shows a filter fabricated from auxetic fibres (a) at a relatively low applied strain and (b) a relatively high applied strain.
Figure 6B:
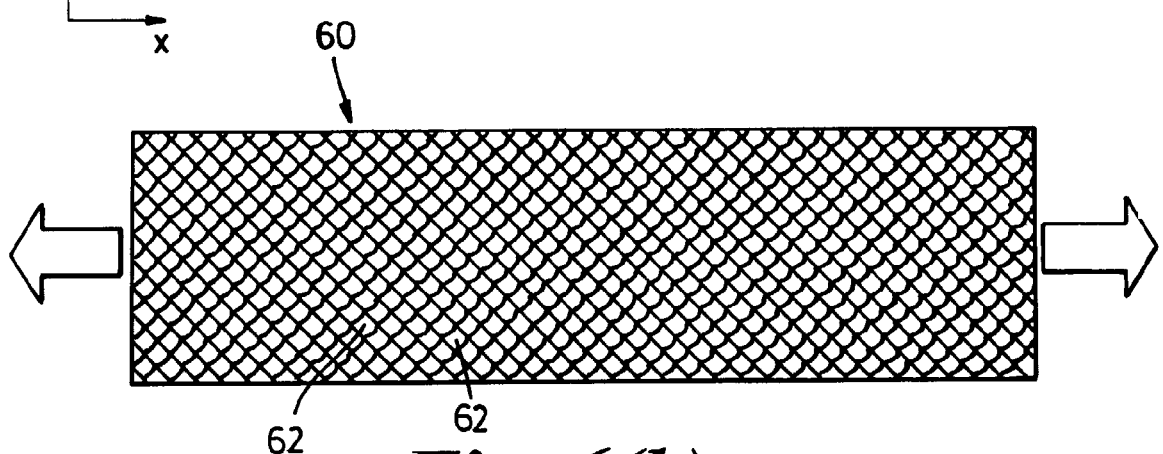

FIG. 6a shows a filter material 60 made from auxetic fibres and defining a plurality of pores 62. FIG. 6a depicts the filter 60 under conditions of low tensile load in the x direction. Under such conditions, the pores 62 are closed or at least of relatively small dimension. FIG. 6b shows the filter 60 under conditions of high tensile load applied along the x axis. Under such conditions of high tensile load, the dimensions the pores 62 increase, i.e. the pores open up. Thus, by stretching or relaxing a filter constructed from appropriately sized auxetic yarns, it is possible to maintain a close control over the pore size in the filter. For example, it is possible to maintain a desired pore size during the working lifetime of the filter, even if the filter becomes blocked by substrate particles during use. It is thus possible to leave a filter in situ for longer, saving on filter replacement and/or cleaning costs as well as reducing down-time. In a further advantageous embodiment, it is possible to clean the filter by applying a tensile load so as to stretch the filter to a configuration in which the pores are opened up sufficiently to allow trapped particles to be dislodged. It is possible to aid the cleaning process by use of a cleaning fluid, which may be a gas or a liquid. However, it is preferred that a cleaning fluid is not employed. In this way, energy consumption costs (which often exceed the cost of the filter) are reduced. Furthermore, it is possible to clean the filter without removing it or having to backflush. By varying the applied tensile load to the filter, it is possible to utilize a single filter which is capable of providing a variety of pore sizes. Thus, a single filter can be used in a number of different applications. By using several layers of auxetic fabrics, it is possible to provide a filter having complex pore shapes. This may be achieved through the use of fabrics constructed from auxetic yarns made with different geometrical parameters, such as wind angle, relative diameters of auxetic yarn or material characteristics. The accurate control of pore size, possibly coupled with the provision of complex pore shapes, can permit higher process yields and allow the filtration of materials with specific structural shapes. It is believed that such methods will be particularly beneficial in the pharmaceutical industry. However, the invention is not limited to use in the pharmaceutical industry: rather, other industrial uses, such as other chemical applications, can be envisaged. Filters of the present invention can also be used in automotive applications.

In a further embodiment, the invention provides novel colour change fabrics. FIG. 7 shows a colour change fabric 70 which comprises a base fabric 72 overlaid by a porous material 74 made from auxetic fibres. The base fabric 72 is of a different colour compared to the porous fabric 74. FIG. 7 shows the colour change fabric 70 in a configuration in which low or no tensile load is applied to the porous fabric 74 along the x axis. In this instance, the pores (not shown) of the porous fabric 74 are substantially closed, and thus when the colour change fabric 70 is viewed from above, the observer will see only the porous fabric 74. The observer will therefore associate the colour of the porous fabric 74 with the colour change fabric 70. FIG. 8 shows the colour change fabric 70 in a configuration in which a relatively high tensile load is applied along the x axis. Under these conditions, pores 76 of the porous fabric 74 are caused to open up substantially (these pores being shown in FIG. 8(a)). Under these conditions, the base fabric 72 becomes visible to an observer viewing the colour change fabric 70 from above. Thus, to the observer, the appearance is given of a colour change. Depending on the dimensions of the auxetic fibres used in the porous fabric 74 and the precise structural details of the porous fabric 74, the observer may be able to discern the porous fabric 74 in the high tensile load configuration depicted in FIG. 8. In this instance, a complex geometrical pattern is seen by the observer. In other embodiments, the porous fabric 74 becomes essentially invisible to the observer, and thus the impression is given that the fabric has completely changed colour. Colour change fabrics of this type can be integrated into a range of garments for novelty and/or fashion purposes, in particular in conjunction with children's clothing. In such embodiments, the appearance of the garment can be changed through everyday use, e.g. through the wearer of the garment bending, stretching or otherwise moving. Garments of the invention include, but are not limited to, trousers, coats, hats, gloves, shirts, t-shirts, underwear, pullovers and other tops, socks and shoes. The invention is not limited to fabric. In particular, the base layer might comprise a non-fabric sheet such as a plastic sheet. The colour change fabric or other structures can be used to indicate the level of strain applied to the fabric or other structure. For example, belts, ropes and webs might be produced for this purpose. The invention is not limited to embodiments in which a colour change is produced. For example, the base layer may have writing, images, logos or other signage located thereon which is revealed when a suitable tensile load is applied to the porous fabric layer.

Figure 9A:
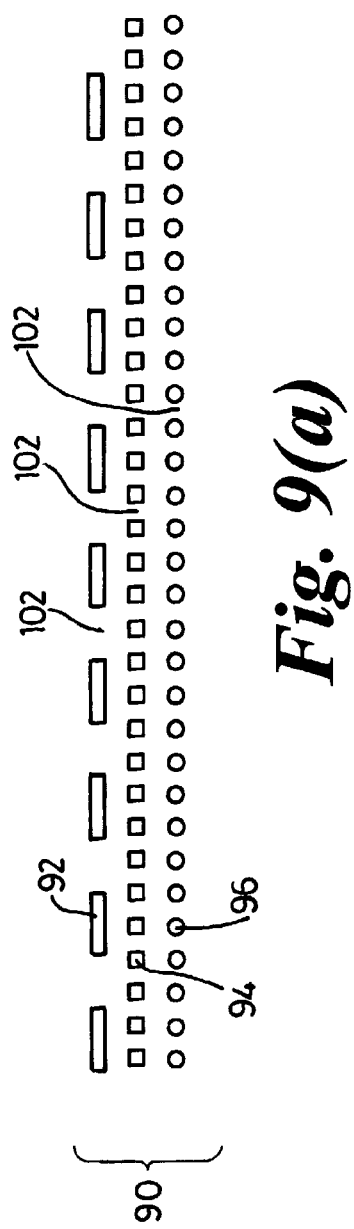
FIG. 9 shows a blast dispersing fabric of the invention (a) before use and (b) during use in dispersing a blast from an explosion.
Figure 9B:
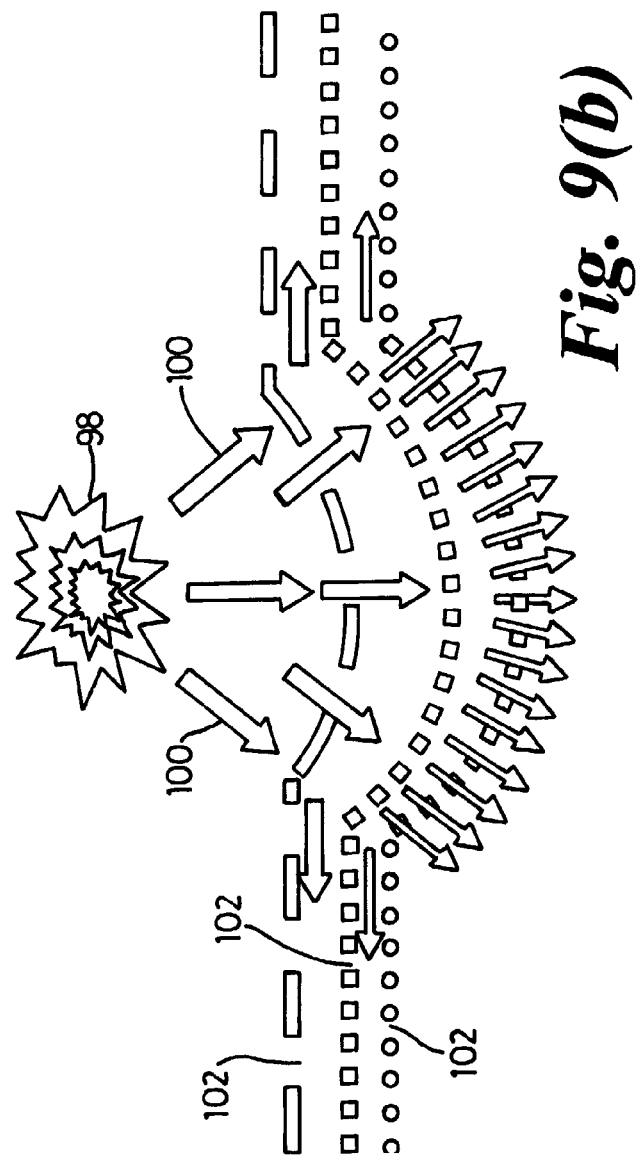

FIG. 9 shows a further embodiment in the invention in which a porous material 90 is used to disperse blast energies from an explosion. The porous material 90 comprises a plurality of layers 92, 94, and 96 of porous material fabricated from auxetic fibres in accordance with the principles described herein. It is also within the scope of the invention to utilise a single layer of porous material for this purpose, although it is believed that the use of a plurality of such porous materials enables blast energies to be dispersed more efficiently. FIG. 9(a) shows the porous fabric 90 in a normal, relaxed configuration prior to a blast. This configuration can be considered to be one in which low tensile load is applied to the porous fabric 90. FIG. 9(b) shows the porous fabric 90 receiving blast energy from an explosion depicted schematically at 98. The blast front caused by the explosion is depicted schematically by the arrows 100 in FIG. 9(b). The blast front from the explosion 98 supplies a tensile load to, successively, the porous material layers 92, 94 and 96 which causes the pores 102 of the porous fabric layers 92, 94 and 96 to open. The provision of a plurality of porous fabric layers 92, 94 and 96 enables energy from the explosion 98 to be successively dispersed through the layers, and also through the voids 104 provided between the layers. It is preferred that the porous fabric layers employed in the porous fabric 90 are different, having different geometric parameters, such as fabric winding angle, pore size, fibre diameter, or different material characteristics, such as different fibre type.

The invention is not limited to the embodiments and examples provided above. Rather, a wide range of applications can be envisaged in which the pore size of a porous material of the type provided by the invention is controlled for an advantageous purpose. For example, breathable fabrics might be provided having a plurality of pores which open up when a wearer of the fabric undertakes an energetic activity, movement such as bending and stretching associated with the activity causing a tensile load to be applied to the fabric thereby causing the pores to open. Additionally; the present invention can be used to control pore size by a way of reducing the size of the pores through application of compressive forces to the material. Porous materials for use in such applications might be provided by applying a tensile load to a porous material to strain the fibres and thus expand the pores, and then causing the material to set in order to retain the pores in the expanded configuration. Thermoset plastics materials might be used for this purpose. The application of a compressive force would reduce the pore size and cause the material to densify. Applications for such materials include shock dispersion applications, such as shock dispersion panels and body armour.

The invention claimed is:

1. A method of dispersing high air pressures comprising the steps of:
    providing a porous material comprising a plurality of interconnected auxetic fibres; and
    exposing the porous material to a pulse of air of high pressure;
    in which: (a) each of the auxetic fibres comprise a first component and a second component which extend generally longitudinally relative to an axis; (b) at least one of the first component and the second component is helically wrapped around the other component; (c) the modulus of elasticity of the first component is greater than the modulus of elasticity of the second component; and (d) variation in a tensile or compressive load applied to the first component causes the radial position of the second component relative to the axis to vary, thereby providing an auxetic effect.

2. A method according to claim 1 in which the porous material comprises a plurality of layers, each layer comprising a plurality of interconnected auxetic fibres.

3. A method according to claim 2 in which at least two layers have different physical characteristics thereby improving the dispersion of the high pressure air.

4. A method according to claim 3 in which the physical characteristic is pore size, fibre winding angle, fibre diameter or fibre type.

5. A method according to claim 1 in which the pulse of air is associated with blast energy from an explosion.

6. A method according to claim 1 in which the porous material comprises a fabric.

7. A method according to claim 6 in which the fabric is woven, knitted, nonwoven, felted, braided or netted.

8. A method according to claim 1 in which pores are formed between adjacent auxetic fibres, wherein helices formed by the first components of the adjacent auxetic fibres are in-phase but of opposite handidness and helices formed by the second components of the adjacent auxetic fibres are in-phase but of opposite handidness.

* * * * *